March 27, 1962 H. PERSICKE ETAL 3,026,544
UPHOLSTERY STRUCTURES OF RESILIENT POLYURETHANE
AND METHOD OF MAKING SAME
Filed July 17, 1956
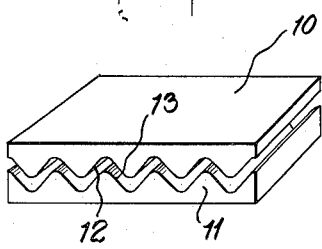
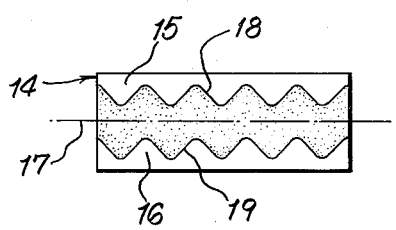
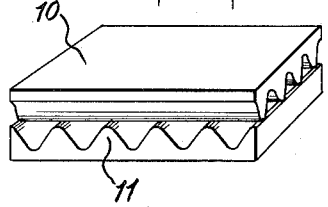
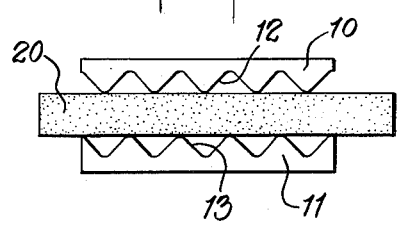
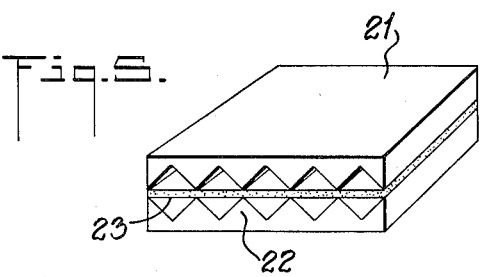
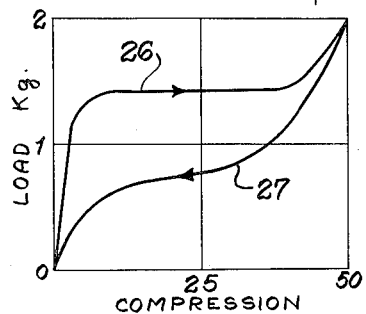
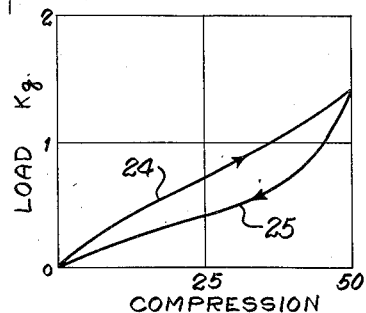
INVENTORS
Herbert Persicke
Robert Schwab
Helmut Schilling
BY
Benj. T. Rauber
their ATTORNEY United States Patent Office 3,026,544
Patented Mar. 27, 1962

3,026,544
UPHOLSTERY STRUCTURES OF RESILIENT POLYURETHANE AND METHOD OF MAKING SAME
Herbert Persicke, Robert Schwab, and Helmut Schilling, Hanau (Main), Germany, assignors to Dunlop Tire and Rubber Corporation, Buffalo, N.Y., a corporation of New York
Filed July 17, 1956, Ser. No. 598,320
Claims priority, application Germany Aug. 3, 1955
6 Claims. (Cl. 5—361)

Our invention relates to upholstery structures of resilient polyurethane and to methods of making the same.

The use of synthetic foam based on polyurethane for cushion material and mattresses is known. This material has the disadvantage that its resilience characteristics are unfavorable compared with foamed latex rubber. Moreover this material has a very high internal damping, which is desirable for many purposes, but is an inconvenience in certain fields of use.

Our invention obviates these disadvantages and provides a cushion or other upholstery structure of economical manufacture in which the compressibility of the cushion, mattress or other structure under light loading is greatly increased. The cushion, mattress or other upholstery structure of our invention is therefore not as stiff and unyielding under light loading as were prior articles of resilient polyurethane foam.

In our invention we provide a sheet or block of resilient polyurethane foam having flat opposite faces and then divide the block on a wavy line to form two blocks each having one plane face and an opposite undulating face. Or a block of the resilient polyurethane foam may be molded or otherwise formed with undulating opposite faces and cut on a plane surface midway of the two undulating surfaces, thus obtaining two blocks each having a plane surface and an undulating surface.

The blocks thus formed may be used as upholstery structures or as units in an upholstery structure in which the undulating surface may be placed crosswise on the undulating surface of another unit or a layer of resilient polyurethane foam may be interposed between undulating surfaces of a pair of resilient polyurethane foam units with the undulations of one unit arranged in any selected manner relative to those in the other. The undulating surface of the unit may be of sine curvature or angular or rounded in any form. It provides a space in which the foam may yield under pressure more easily, giving a greater compression under light loads.

The various features of our invention are illustrated by way of example in the accompanying drawings in which:

FIG. 1 is a perspective view of a block of resilient polyurethane foam divided on a plane of sine curvature into two equal blocks or units, FIG. 2 shows a block of the foam material having opposite faces of parallel sine curvature and a flat dividing plane to form two units similar to those of FIG. 1, FIG. 3 shows an upholstery structure formed of two of the units made as in FIG. 1 or FIG. 2, FIG. 4 is another type of upholstery structure formed of units of FIG. 1 or FIG. 2, FIG. 5 is still another structure embodying my invention and using units similar to those of FIGS. 1 and 2, FIG. 6 is a graph showing the load-compression characteristics of the structure of FIG. 1, and FIG. 7 is a graph of the load-compression characteristics of the structure of FIG. 3 with the loading in kilograms applied throughout a piece of the structure having a square area of five centimeters on each edge.

In the embodiment shown in FIG. 1 a block of the resilient polyurethane foam is divided into two equal blocks 10 and 11 on a sinuous dividing plane to form two surfaces 12 and 13 of sine curvature. In the embodiment of FIG. 2 two similar units are formed by dividing a block 14, formed, between two mold parts 15 and 16 having opposed surfaces of sine curvature on a plane dividing line 17 midway between the sine surfaces 18 and 19.

A complete upholstery structure may be formed as shown in FIG. 3 by superposing a pair of the units 10 and 11, formed as shown in FIG. 1 or FIG. 2 with their undulating surfaces opposed and crossing each other at 90°. The exposed faces are in flat planes, but may be shaped to any conformation to suit a particular purpose.

In the embodiment shown in FIG. 4 the two units 10 and 11 are placed on opposite surfaces of a sheet 20 of polyurethane foam with the sine surfaces 12 and 13 parallel so that the apex of one sine is opposed to the valley of the other. In the embodiment shown in FIG. 5 two units 21 and 22 are placed on opposite surfaces of a sheet 23 with the apices of one opposed to the apices of the other. In these units the undulating surfaces are of triangular form.

FIG. 6 shows the load characteristics of the upholstery structures of the above embodiments, that of FIG. 3 for example. The loading is indicated in the ordinate in kilograms on a square area of twenty-five square centimeters of the structure and the abscissa showing the corresponding compression in percent. Curve 24 indicates the characteristics of the structure of the invention and curve 25 that of a full structure. In FIG. 7 the curves 26 and 27 indicate corresponding characteristics when the weight is applied to a structure or section of a structure of 25 square centimeters or five centimeters on each side.

By means of the above invention upholstery structures may be made having any desired resiliency or relation of compression to load.

Having described our invention, what we claim is:

1. An upholstery structure of two units each having one plane surface and an opposite undulating surface, the undulating surface of one unit being opposed to the undulating surface of the other unit.

2. The upholstery structure of claim 1 in which the units are of resilient polyurethane foam.

3. The upholstery structure of claim 2 in which the undulations of one unit are transverse to those of the other.

4. The upholstery structure of claim 2 in which a sheet of resilient polyurethane foam is interposed between the units.

5. The upholstery structure of claim 4 in which the apices of one unit are opposite the valleys of the other.

6. The upholstery unit of claim 4 in which the apices of one unit are opposed to the apices of the other.

References Cited in the file of this patent

UNITED STATES PATENTS

| 2,194,364 | Minor | Mar. 19, 1940 |
| 2,836,228 | Dahle | May 27, 1958 |

FOREIGN PATENTS

| 376,937 | Great Britain | July 21, 1932 |
| 683,754 | Great Britain | Dec. 3, 1952 |

Notice of Adverse Decision in Interference

In Interference No. 92,897 involving Patent No. 3,026,544, H. Persicke, R. Schwab and H. Schilling, Upholstery structures of resilient polyurethane and method of making same, final judgment adverse to the patentees was rendered Nov. 29, 1963, as to claims 1, 2, 3, 4 and 5.
[*Official Gazette April 28, 1964.*]